(12) United States Patent
Rossmanith

(10) Patent No.: US 7,288,897 B2
(45) Date of Patent: Oct. 30, 2007

(54) CIRCUIT ARRANGEMENT FOR OPERATING AT LEAST ONE HIGH PRESSURE DISCHARGE LAMP

(75) Inventor: Thomas Rossmanith, Munich (DE)

(73) Assignee: Patent-Treuhand-Gesellschaft for Elektrisch Gluhlampen mbH, Munich ( * ) Notice: Subject to any disclaimer, the term of this patent is extended or adjusted under 35 U.S.C. 154(b) by 323 days.

(21) Appl. No.: 11/208,790

(22) Filed: Aug. 23, 2005

(65) Prior Publication Data

US 2006/0049779 A1    Mar. 9, 2006

(30) Foreign Application Priority Data

Sep. 6, 2004    (DE) ............... 10 2004 042 996

(51) Int. Cl.
*H05B 37/02*    (2006.01)
(52) U.S. Cl. ............... 315/194; 315/224; 315/291; 315/DIG. 7
(58) Field of Classification Search ............... 315/186, 315/194, 197, 200 R, 205, 209 R, 224, 225, 315/291, 294, 307, 361, DIG. 7
See application file for complete search history.

(56) References Cited

U.S. PATENT DOCUMENTS 6,175,195 B1 * 1/2001 Janczak et al. ............... 315/194
6,633,138 B2 * 10/2003 Shannon et al. ............... 315/224
7,187,139 B2 * 3/2007 Jin ............... 315/274
2003/0102824 A1   6/2003 Kramer ............... 315/224

FOREIGN PATENT DOCUMENTS

DE    103 33 820    2/2005

* cited by examiner

*Primary Examiner*—Douglas W. Owens
*Assistant Examiner*—Jimmy Vu
(74) *Attorney, Agent, or Firm*—Carlo Bessone

(57) ABSTRACT

A circuit arrangement for operating at least one high-pressure discharge lamp having four switches in a full bridge arrangement, a first and a second switch forming the first half-bridge arm, and a third and a fourth switch forming the second half-bridge arm, at least two terminals for coupling the high pressure discharge lamp between the midpoint of the half-bridge arms, at least one terminal for supplying the circuit arrangement with a DC voltage signal, and a drive circuit for driving the four switches, the drive circuit being designed to provide a first drive signal for the switches of the arm and a second drive signal for those of the second arm in such that the drive signals are derived from a base signal whose clock pulse is swept between a first and a second frequency.

16 Claims, 3 Drawing Sheets

CIRCUIT ARRANGEMENT FOR OPERATING AT LEAST ONE HIGH PRESSURE DISCHARGE LAMP

FIELD OF THE INVENTION

The present invention relates to a circuit arrangement for operating at least one high-pressure discharge lamp having four switches in a full bridge arrangement, a first and a second switch forming the first half-bridge arm, and a third and a fourth switch forming the second half-bridge arm, at least two terminals for coupling the high pressure discharge lamp between the midpoint of the first and of the second half-bridge arms, at least one terminal for supplying the circuit arrangement with a DC voltage signal, and a drive circuit for driving the four switches, the drive circuit being designed to provide a first drive signal for the switches of the first half-bridge arm and a second drive signal for the switches of the second half-bridge arm in such a way that the first and the second drive signals are derived from a base signal whose clock pulse is swept between a first and a second frequency, and in such a way that the first and the second drive signals have a phase difference which is modulated with a prescribeable third frequency.

BACKGROUND OF THE INVENTION

Such a circuit arrangement is disclosed in DE 103 33 820.9 from the same applicant as the present application. The disclosure content of this application, particularly with regard to the prior art described there as well as the statements on phase modulation, is incorporated into the present application by this reference. However, the circuit arrangement presented there for carrying out a phase modulation is attended by very high outlay on implementation that is reflected in the costs.

As is therefore known to the person skilled in the art, the frequency of the base signal is selected such that said frequency is between the first azimuthal resonant mode and the first radial acoustic resonant mode of the lamp. Moreover, the third frequency is selected such that the latter corresponds approximately to the second longitudinal resonant frequency of the lamp.

In relation to the prior art, reference may further be made to U.S. 2003/0102824 A1, which discloses a circuit arrangement for the high-frequency operation—the carrier frequency being between 400 and 600 kHz—of a high pressure discharge lamp. As is known to the person skilled in the art, during operation of a high pressure discharge lamp with a carrier frequency in this frequency range there is no need to take any measure for arc straightening. In DE 103 33 820.9, the sweeping of the carrier frequency serves the purpose of arc straightening. In order to prevent color segregation, in the abovementioned U.S. 2003/0102824 A1 a low-frequency signal of the order of magnitude between 20 and 30 kHz and which corresponds to the second longitudinal resonant frequency is used to switch to and fro between two carrier frequencies. The frequency range used in this publication for the carrier frequency is, however, not desired in practice since it is attended by emission problems. It would not be possible to implement an operation of the circuit arrangement proposed in the abovementioned US document with carrier frequencies in the range around 50 kHz, since the required filter characteristic would be associated with a high outlay on components given such a low frequency. The modulation frequency is coupled to the carrier frequency in a fixed fashion owing to the filter used and to the sweeping.

SUMMARY OF THE INVENTION

It is therefore the object of the present invention further to improve the circuit arrangement disclosed in DE 103 33 820.9.

The present invention is based on the finding that the above object can be achieved in a simple way when the drive circuit is designed to switch to and fro by means of a switch between derivatives of the base signal with a different phase shift. It is possible by means of this measure to dispense with a sinusoidal modulation signal that was required in DE 103 338 820.9 and was therefore produced in the circuit arrangement. The degree of amplitude modulation can be varied in a simple way by the magnitude of the phase shift. The boundary conditions are thereby set for implementing this principle in a simple way by means of a microcontroller without external wiring. By comparison with U.S. 2003/0102824 A1, in the case of the present invention the carrier frequency and the third frequency used for modulation are not coupled to one another, and so the additional measure for arc straightening, that is to say the sweeping of the carrier frequency, can easily be converted into a circuit arrangement according to the invention. From the comparison with the known circuit arrangements, the solution according to the invention is distinguished by a reduction in complexity and a reduction in the costs of implementation.

The control circuit is preferably designed to drive the in each case two switches of a half-bridge arm with complementary signals.

One category of embodiments is distinguished in that the drive circuit has a switch which is designed to switch to and fro between two representations of the base signal with a different phase angle in time with the third frequency in order to derive the second drive signal from the base signal. By comparison with the base signal, the first control signal then has a fixed phase shift, in the simplest case a phase shift of 0°. This constitutes the possibility of implementation with the lowest outlay.

It is further preferred to invert the first drive signal in relation to the base signal. It is possible thereby to select the operating point, that is to say if the first drive signal is inverted, the power consumption of the lamp drops with a rising phase shift. Conversely, in the case of a non-inverted first drive signal the power consumption in the lamp rises with rising phase shift.

The phase shift between the base signal and the control signal can be used for the purpose of power setting.

A second category of embodiments is distinguished in that the drive circuit has two switches, the first switch being designed to switch to and fro between two representations of the base signal with a different phase angle in time with the third frequency in order to derive the first drive signal from the base signal, and the second switch being designed to switch to and fro between two representations of the base signal with a different phase angle in time with the third frequency in order to derive the second drive signal from the base signal. The power setting can be undertaken here by means of the relative phase angle of the representations of the base signal, between which there is switching to and fro in each case.

It is preferred, furthermore, that the phase shift between the first and the second drive signals is performed in a dual alternating fashion, the base phase shift being prescribeable, as mentioned, for the purpose of power setting.

In a preferred fashion, the sweep frequency is between 50 Hz and 500 Hz, preferably between 80 Hz and 200 Hz. In a preferred fashion, the frequency of the base signal is below 150 kHz, preferably between 35 and 70 kHz or between 80 and 120 kHz. It is furthermore preferred to sweep the frequency of the base signal between substantially 40 kHz +/−10% and 60 kHz +/−10%. In a preferred fashion, the third frequency is below 50 kHz, preferably between 20 and 35 kHz.

The drive circuit can be implemented both by means of hardware and software and in combinations of hardware and software.

Further advantageous embodiments emerge from the subclaims.

BRIEF DESCRIPTION OF THE DRAWINGS

An exemplary embodiment will now be described in more detail below with reference to the attached drawings, in which.

DETAILED DESCRIPTION OF THE INVENTION

Figure 1:
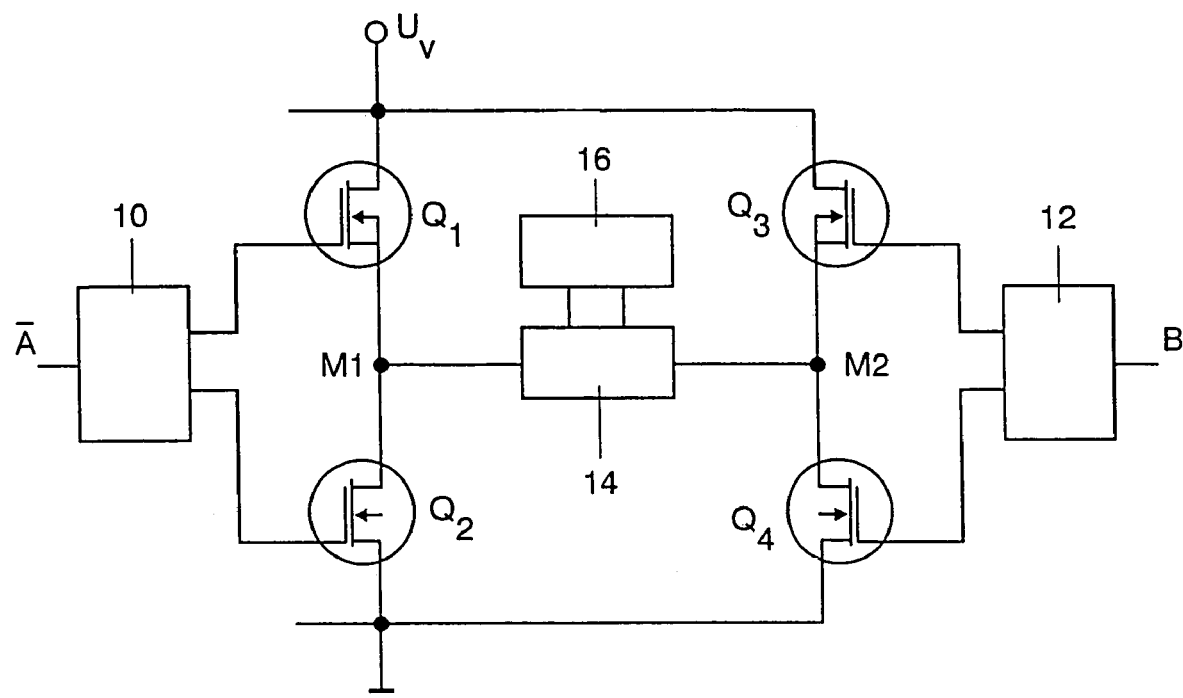
FIG. 1 shows a schematic of a first part of a circuit arrangement according to the invention.

FIG. 1 shows a first part of a circuit arrangement according to the invention. Here, four switches $Q_1$ to $Q_4$ are driven in a full bridge arrangement via respective driver circuits 10, 12. The signals provided at the output of the respective driver circuits 10, 12 are complementary to one another. Coupled between the midpoints M1, M2 of the two half-bridge arms is an LC circuit 14 to which a high pressure discharge lamp 16 is connected. The circuit arrangement is supplied with a DC voltage signal $U_v$, for example 400 V DC. The driver circuit 10 is driven with a signal $\overline{A}$ and the driver circuit 12 with a signal B, the generation and time profile of which will be examined in more detail with reference to FIGS. 2 and 3.

Figure 2:
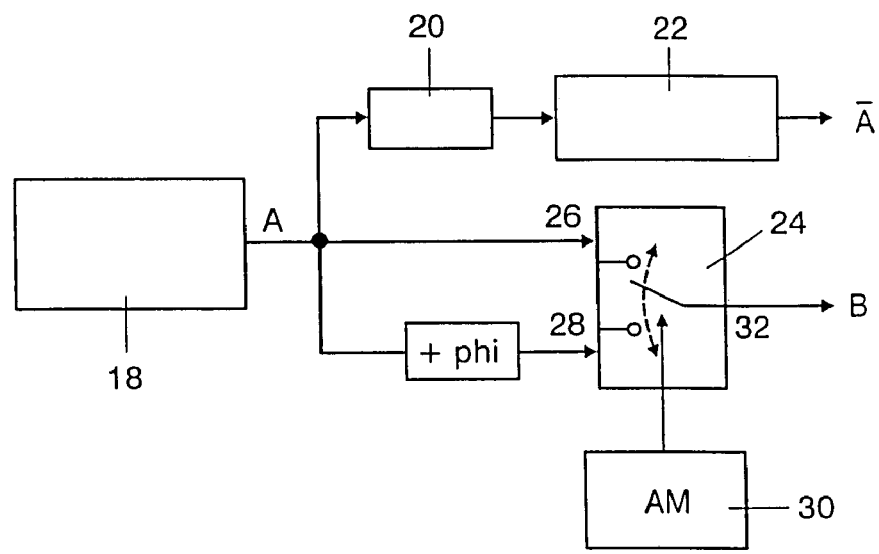
FIG. 2 shows a schematic of a second part of a circuit arrangement according to the invention.
Figure 3:
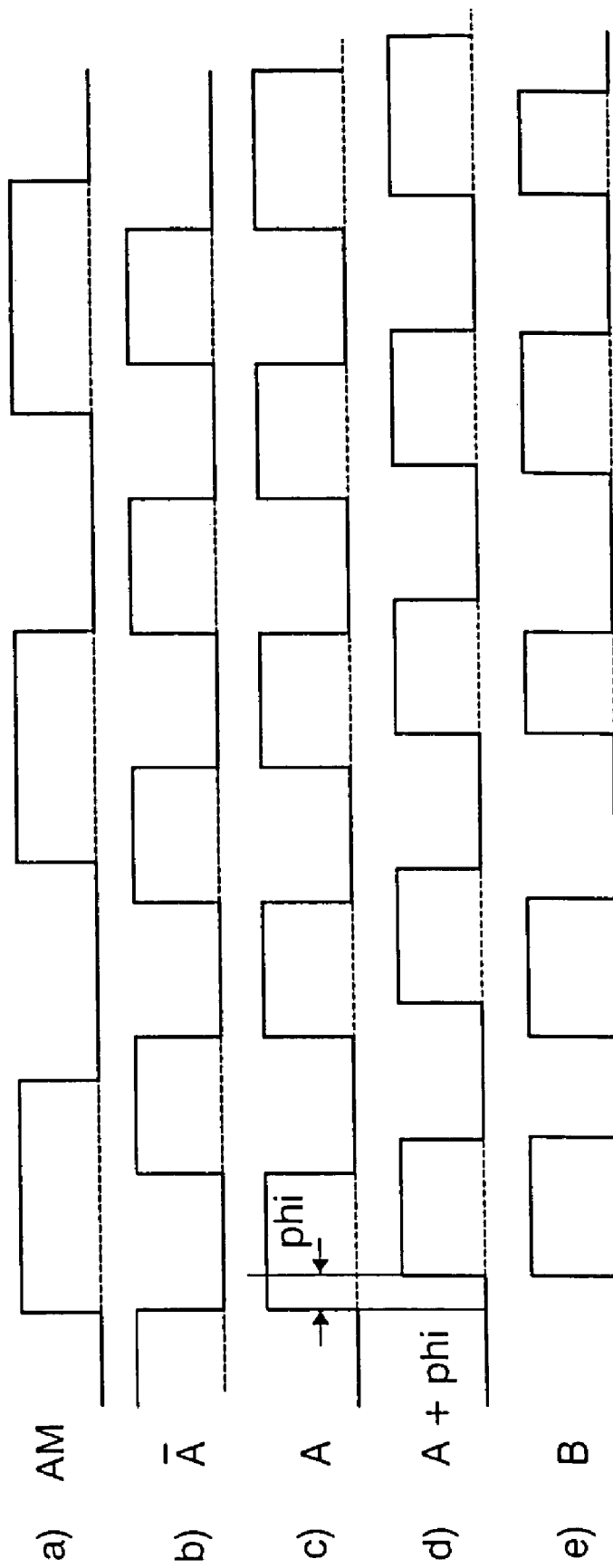
FIG. 3 shows a schematic of the time profile of various signals.

In accordance with FIG. 2, in order to generate the signals $\overline{A}$ and B an oscillator device 18 firstly provides a square-wave signal A that is swept between 40 kHz and 60 kHz and whose time profile is to be seen in FIG. 3 as curve c). This traverses an inverter 20 and a unit 22 for power setting by varying the phase shift in relation to the signal A. The signal $\overline{A}$ is provided at the output of the unit 22. Moreover, the signal A is applied to a first input 26 of a switching device 24 and to a second input 28 of the switching device 24 as signal A+phi in a variant displaced by the angle+phi. The device 30 effects switching to and fro between the inputs 26 and 28 of the switching device 24 in time with a frequency $f_{AM}$ that is between 20 and 35 kHz. The signal present at the input 26 or at the input 28 is correspondingly alternatively provided at the output 32 as signal B.

As mentioned, the time profile of the signal A is firstly to be recognized in FIG. 3 as curve c). The curve b) shows the profile inverted relative thereto, specifically the signal $\overline{A}$. Curve d) shows the profile of the signal A+phi, which is displaced by +phi from the signal A. The curve a) shows the profile of the switching signal AM, which determines at which instant the signal A and at which instant the signal A+phi is led to the output of the switching device 24 and is provided there as signal B. The time profile of the signal B is illustrated as curve e).

Figure 4:
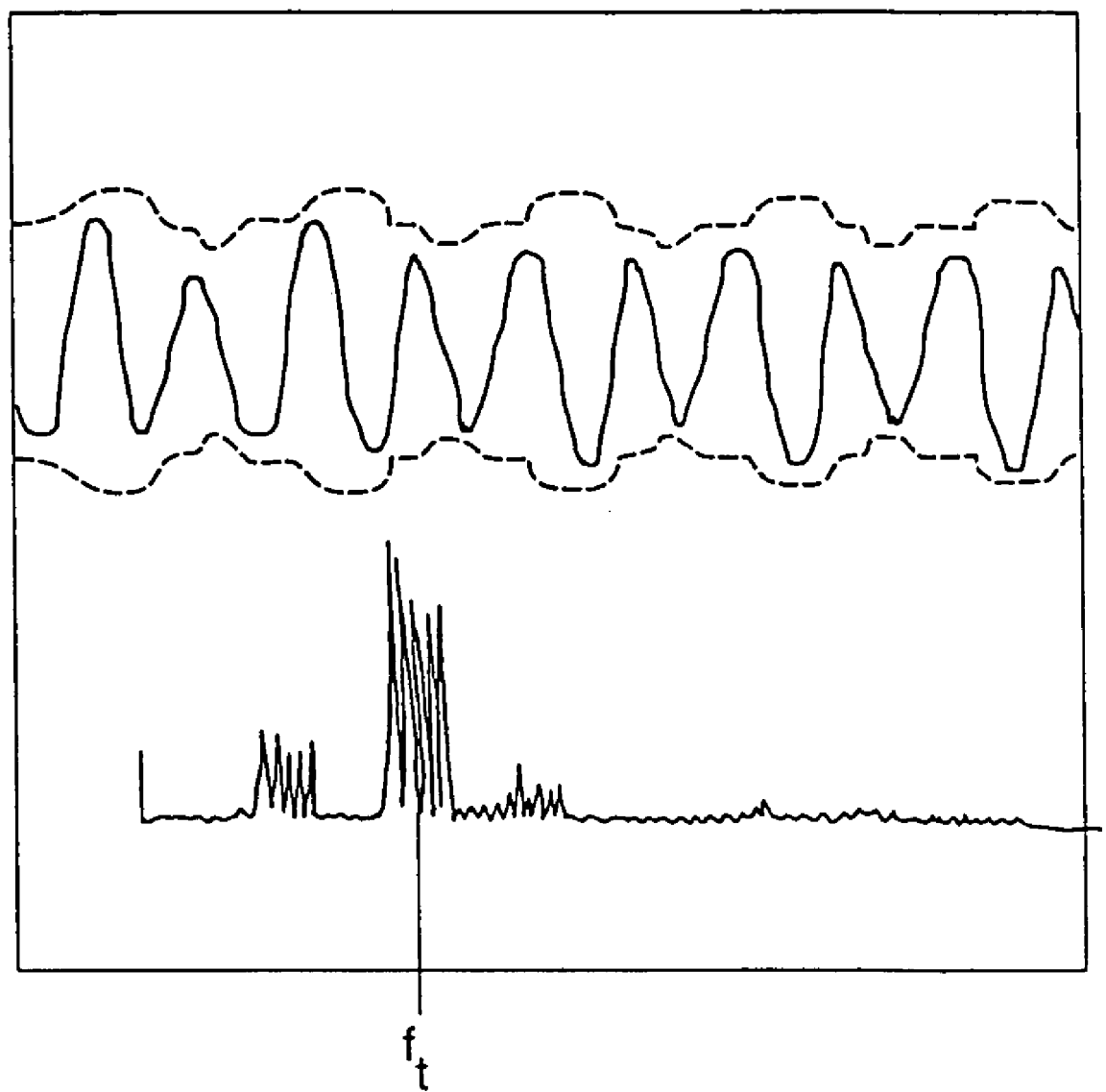
FIG. 4 shows the time profile, measured from an exemplary embodiment of a circuit arrangement according to the invention, of the lamp voltage, as well as the amplitude spectrum of the lamp voltage.

FIG. 4 shows at the top the time profile of the lamp voltage connected to the lamp 16. The envelope in which the switching frequency $f_{AM}$ is reproduced is well in evidence. Recognizable therebelow is the amplitude spectrum, which reflects the frequency $f_r$ of the signal A. The sidebands are arranged at a spacing of $+/-f_{AM}$ from $f_r$.

The invention claimed is:

1. A circuit arrangement for operating at least one high-pressure discharge lamp (16) having:

four switches ($Q_1$ to $Q_4$) in a full bridge arrangement, a first and a second switch ($Q_1$, $Q_2$) forming the first half-bridge arm, and a third and a fourth switch ($Q_3$, $Q_4$) forming the second half-bridge arm, at least two terminals for coupling the high pressure discharge lamp between the midpoint (M1, M2) of the first and of the second half-bridge arms, at least one terminal for supplying the circuit arrangement with a DC voltage signal ($U_v$); and a drive circuit for driving the four switches, the drive circuit being designed to provide a first drive signal ($\overline{A}$) for the switches ($Q_1$, $Q_2$) of the first half-bridge arm and a second drive signal (B) for the switches ($Q_3$, $Q_4$) of the second half-bridge arm in such a way that the first and the second drive signals ($\overline{A}$, B) are derived from a base signal (A) whose clock pulse is swept between a first and a second frequency, and in such a way that the first and the second drive signals ($\overline{A}$, B) have a phase difference which is modulated with a prescribeable third frequency ($f_{AM}$), characterized in that in order to modulate the phase difference the drive circuit comprises at least one switch (24) which is designed in such a way as to switch to and fro between derivatives of the base signal with a different phase shift in time with the third frequency ($f_{AM}$).

2. The circuit arrangement as claimed in claim 1, characterized in that the drive circuit is designed to drive the in each case two switches ($Q_1$, $Q_2$; $Q_3$, $Q_4$) of a half-bridge arm with complementary signals.

3. The circuit arrangement as claimed in claim 1, characterized in that the drive circuit has a switch (24) which is designed to switch to and fro between two representations of the base signal with a different phase angle in time with the third frequency ($f_{AM}$) in order to derive the second drive signal (B) from the base signal.

4. The circuit arrangement as claimed in claim 1, characterized in that the first drive signal ($\overline{A}$) exhibits a fixed phase shift by comparison with the base signal.

5. The circuit arrangement as claimed in claim 4, characterized in that the first drive signal ($\overline{A}$) is inverted in relation to the base signal.

6. The circuit arrangement as claimed in claim 4, characterized in that the phase shift between the base signal and the first drive signal ($\overline{A}$) can be prescribed for the purpose of power setting.

7. The circuit arrangement as claimed in claim 1, characterized in that the drive circuit has two switches, the first switch being designed to switch to and fro between two representations of the base signal with a different phase angle in time with the third frequency ($f_{AM}$) in order to derive the first drive signal from the base signal, and the second switch being designed to switch to and fro between two representations of the base signal with a different phase angle in time with the third frequency ($f_{AM}$) in order to derive the second drive signal from the base signal.

8. The circuit arrangement as claimed in claim 7, characterized in that the phase shift between the first and the second drive signals is performed in a dual alternating fashion, the base phase shift being prescribeable for the purpose of power setting.

9. The circuit arrangement as claimed in claim 1, characterized in that the sweep frequency ($f_s$) is between 50 Hz and 500 Hz, preferably between 80 Hz and 200 Hz.

10. The circuit arrangement as claimed in claim 1, characterized in that the frequency ($f_1$) of the base signal (A) is below 150 kHz, preferably between 35 and 70 kHz or between 80 and 120 kHz.

11. The circuit arrangement as claimed in claim 10, characterized in that the drive circuit is designed to sweep the frequency ($f_1$) of the base signal between substantially 40 kHz +/−10% and 60 kHz +/−10%.

12. The circuit arrangement as claimed in claim 1, characterized in that the third frequency ($f_{AM}$) is below 50 kHz, preferably between 20 and 35 kHz.

13. The circuit arrangement as claimed in claim 1, characterized in that the drive circuit is implemented by means of hardware and/or software.

14. The circuit arrangement as claimed in claim 2, characterized in that the drive circuit has a switch (24) which is designed to switch to and fro between two representations of the base signal with a different phase angle in time with the third frequency ($f_{AM}$) in order to derive the second drive signal (B) from the base signal.

15. The circuit arrangement as claimed in claim 5, characterized in that the phase shift between the base signal and the first drive signal ($\overline{A}$) can be prescribed for the purpose of power setting.

16. The circuit arrangement as claimed in claim 2, characterized in that the drive circuit has two switches, the first switch being designed to switch to and fro between two representations of the base signal with a different phase angle in time with the third frequency ($f_{AM}$) in order to derive the first drive signal from the base signal, and the second switch being designed to switch to and fro between two representations of the base signal with a different phase angle in time with the third frequency ($f_{AM}$) in order to derive the second drive signal from the base signal.

\* \* \* \* \*